J. P. COLEMAN.
RAILWAY SIGNAL.
APPLICATION FILED AUG. 5, 1912.

1,138,087.

Patented May 4, 1915.
6 SHEETS—SHEET 2.

WITNESSES

INVENTOR

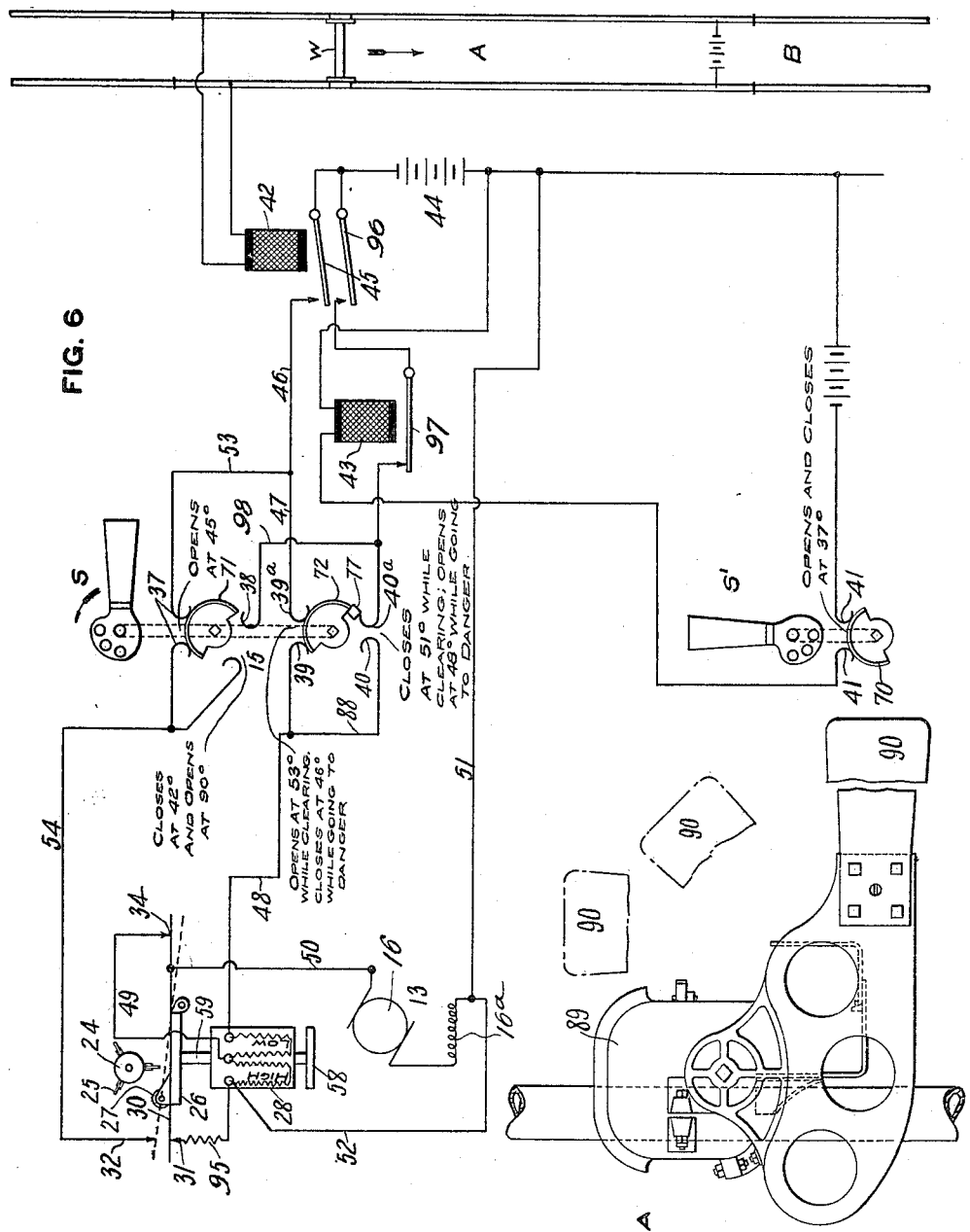

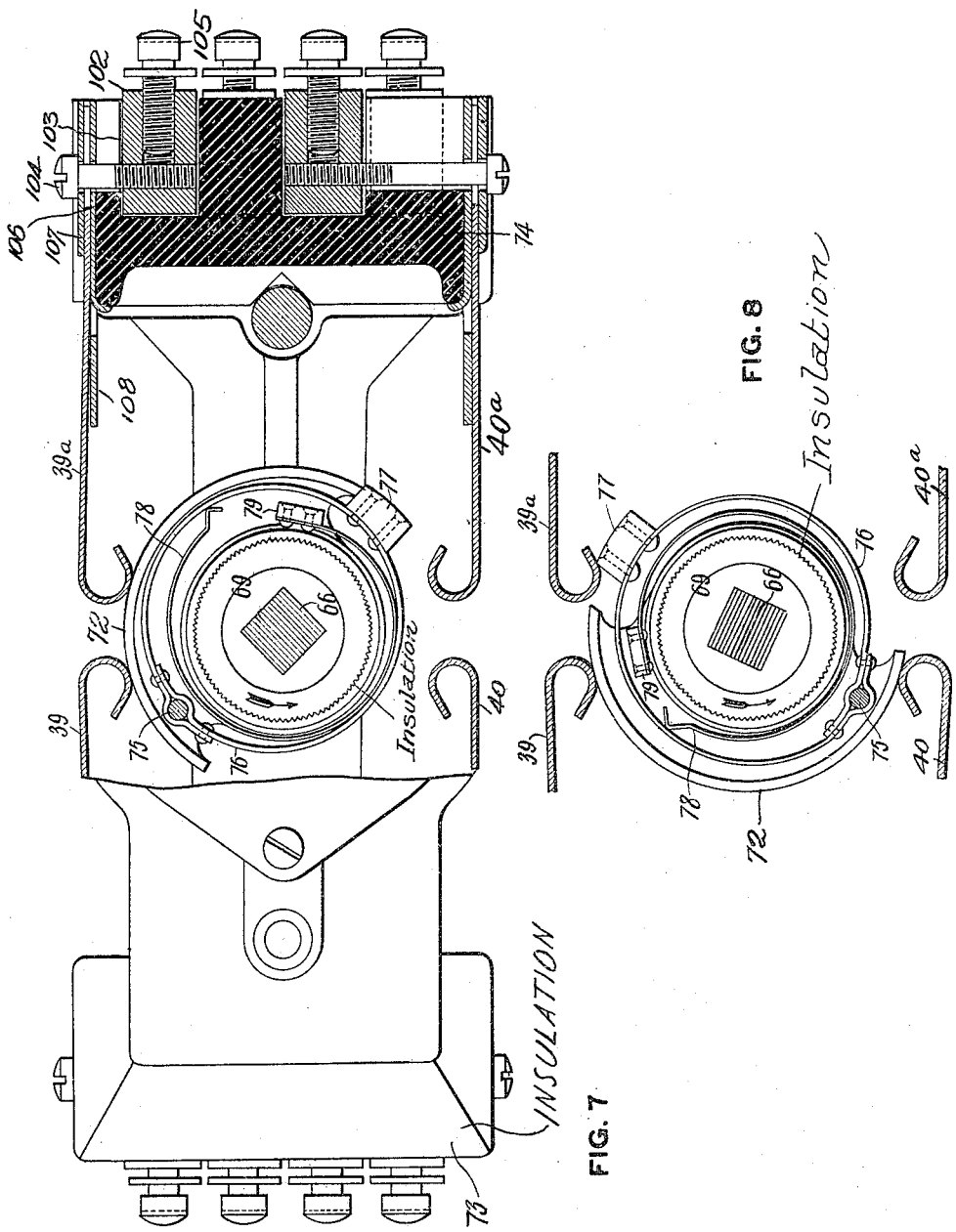

J. P. COLEMAN.
RAILWAY SIGNAL.
APPLICATION FILED AUG. 5, 1912.

1,138,087.

Patented May 4, 1915.
6 SHEETS—SHEET 6.

WITNESSES

INVENTOR

UNITED STATES PATENT OFFICE.

JOHN P. COLEMAN, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-SIGNAL.

1,138,087. Specification of Letters Patent. Patented May 4, 1915.

Application filed August 5, 1912. Serial No. 713,239.

*To all whom it may concern:*

Be it known that I, JOHN P. COLEMAN, a citizen of the United States, residing at Edgewood borough, in the county of Allegheny and State of Pennsylvania, have invented certain new and useful Improvements in Railway-Signals, of which the following is a specification.

My invention relates to signals of the type comprising a signal device biased to one position of indication, a motor for moving it to one or more other positions of indication, and a holding device for holding it in the one or more positions to which it has been moved.

I will describe one form of railway signal embodying my invention, and will then point out the novel features thereof in claims.

Figure 1:
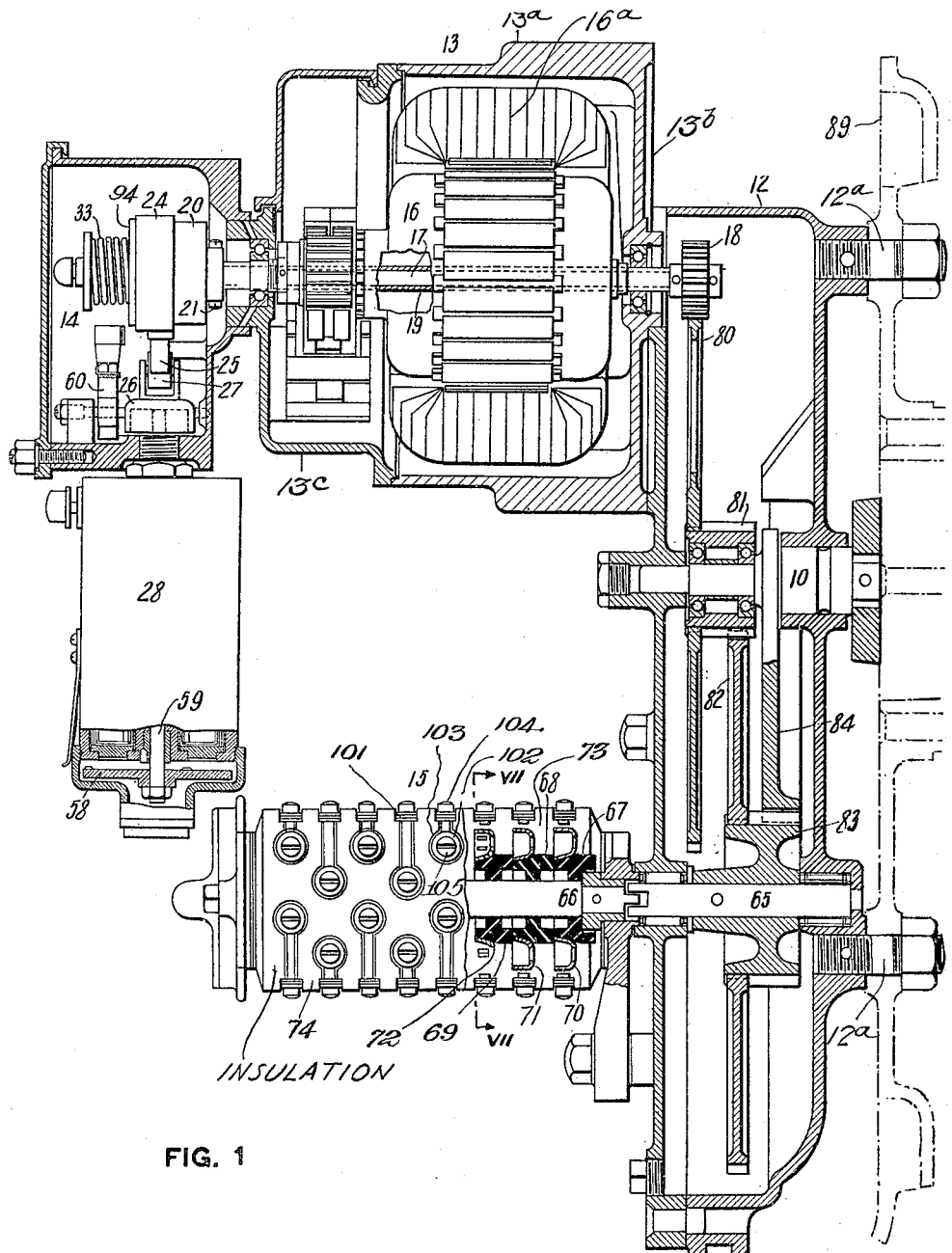
Figure 2:
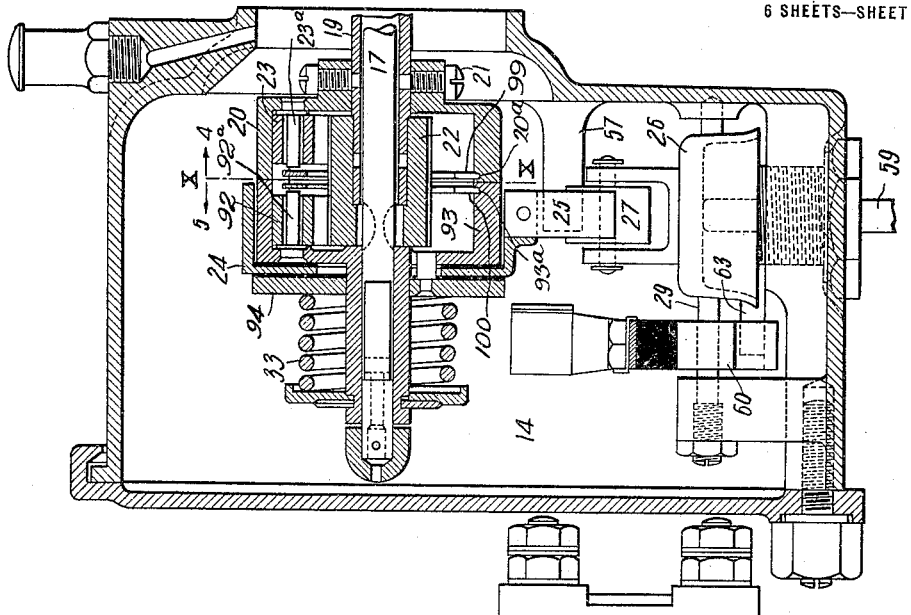
Figure 3:
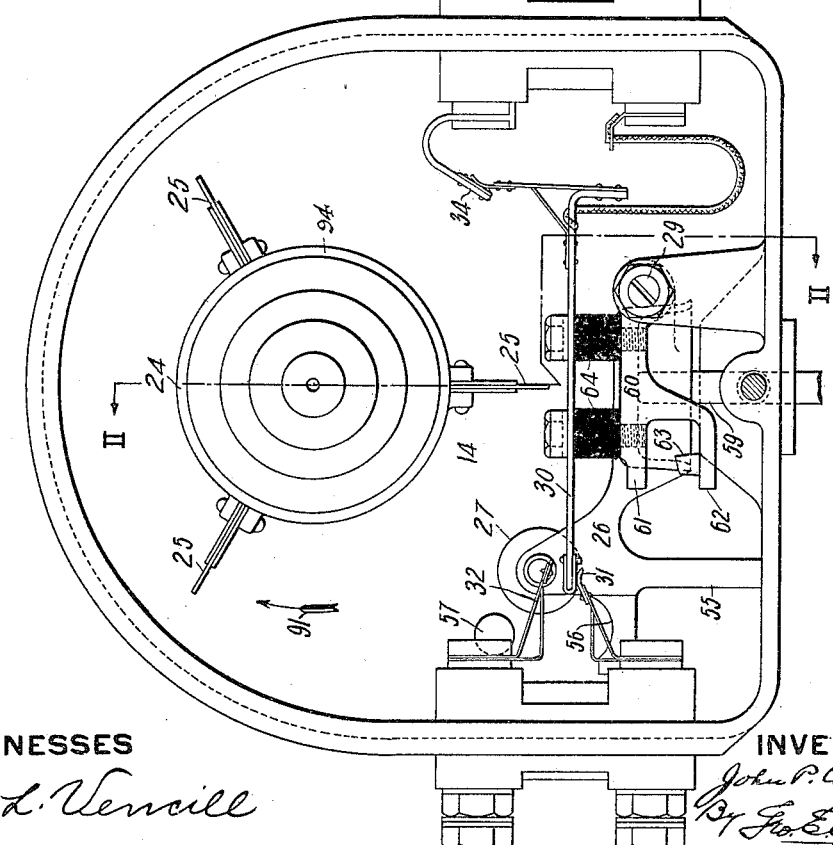
Figure 4:
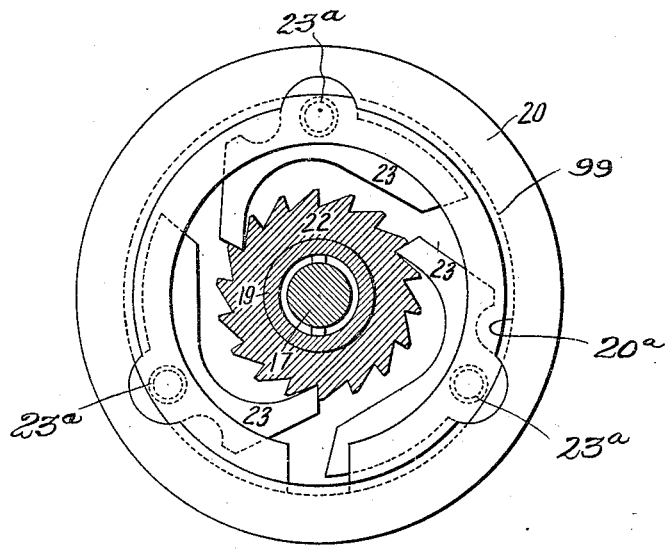
Figure 5:
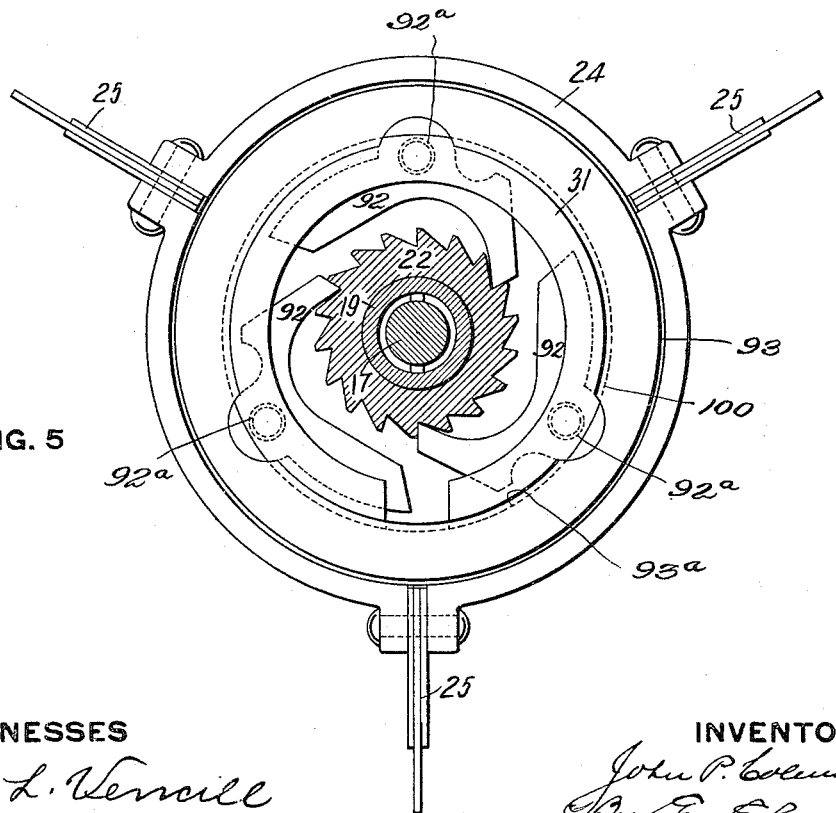
Figure 10:
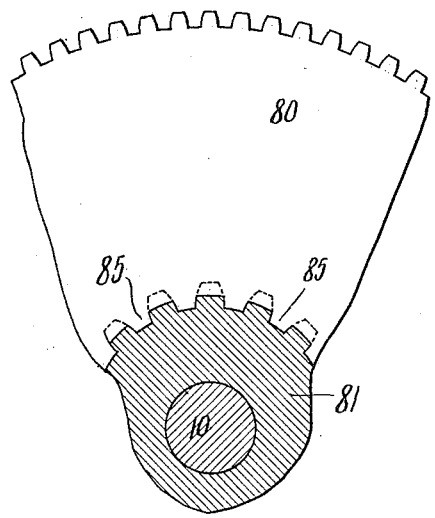
Figure 9:
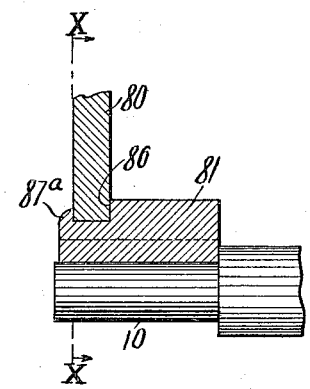
Figure 11:
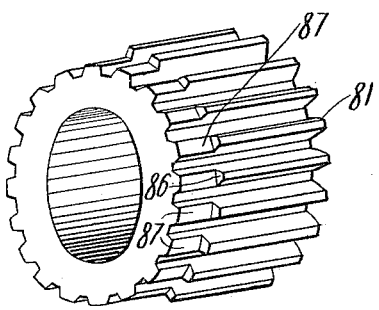

In the accompanying drawings, Figure 1 is a view showing in side elevation partly sectioned one form of railway signal embodying my invention, the semaphore being removed. Fig. 1$^a$ is a view showing in front elevation the signal shown in Fig. 1 and including the semaphore. Fig. 2 is a sectional view on the line II—II of Fig. 3 showing on an enlarged scale the holding device shown in Fig. 1. Fig. 3 is a view showing in end elevation the form of holding device shown in Figs. 1 and 2. Fig. 4 is a sectional view on the line X—X of Fig. 2 looking in the direction of the arrow 4, and Fig. 5 is a similar view but looking in the direction of arrow 5. Fig. 6 is a diagram showing one arrangement of circuits and apparatus for the control of the signal shown in the preceding views. Fig. 7 is a sectional view on the line VII—VII of Fig. 1, showing the circuit controller in one position, and Fig. 8 is a view showing a portion of the circuit controller shown in Fig. 7 but with the parts in another position. Fig. 9 is a fragmental view on an enlarged scale of a portion of gear wheel 80 and pinion 81 shown in Fig. 1. Fig. 10 is a sectional view on the line X—X of Fig. 9. Fig. 11 is a perspective view of pinion 81 shown in Figs. 1, 9 and 10.

Similar reference characters refer to similar parts in each of the several views.

Referring first to Figs. 1 and 1$^a$, 89 designates an outside case (only the front portion of which is shown in Fig. 1) within which is mounted a gear-inclosing casing 12. The casing 12 is fixed to the outside case by screws 12$^a$. Mounted in the casing 12 is a shaft 10, one end of which projects outside of the case 89 and carries a suitable signaling device 90, here shown as being a semaphore. Fixed to the casing 12 is an electric motor 13 adapted to move the semaphore 90 by means hereinafter explained. This motor may be of any desired type; as here shown it is a direct current motor comprising an armature 16 and a field 13$^a$. The field 13$^a$ is provided with a plurality of radially disposed and inwardly projecting pole-pieces on which is a winding 16$^a$.

The semaphore is preferably biased to the horizontal or "danger" position, and in the particular arrangement of mechanism here shown (see Fig. 6) it is moved by the motor to two other positions, the inclined or "caution" position and the vertical or "clear" position. It is understood however that the mechanism may be arranged for the semaphore to have any desired number of positions of indication, the changes required in the mechanism being well understood by those skilled in the art. It is also understood that the mechanism may equally well be arranged for the semaphore to be moved downwardly from the horizontal position to its other positions.

14 is a holding device for holding the semaphore in the caution and clear positions, hereinafter explained in detail.

15 is a circuit controller actuated by the mechanism for the control of circuits pertaining to the signal, which circuit controller will be explained hereinafter.

Fixed to the outside end of motor field 13$^a$ is a motor head 13$^c$. A spindle 17 is mounted in ball-bearings supported in the two motor heads 13$^c$ and 13$^b$. This spindle is operatively connected with semaphore 90 by means of suitable gearing which, as here shown, comprises a segmental gear 84 fixed to the shaft 10, a pinion 83 and a gear wheel 82 both fixed on a shaft 65 journaled in casing 12, a pinion 81 and a gear wheel 80 rigidly connected and both mounted on ball bearings carried on shaft 10, and a pinion 18 fixed to the spindle 17.

The gear 80 is fixed to pinion 81 in the following manner: As shown clearly in Fig. 11, the teeth of the pinion are cut part way down adjacent one end leaving only short stubs 87. The bore of the hub of gear wheel 80 is provided with one or more internally projecting teeth 85 (see Fig. 10) which match with the stubs 87 of the pinion. As here shown the number of teeth in the bore of the gear wheel corresponds with the number of teeth on the pinion. The gear wheel is forced over the stubs 87 until the wheel abuts against shoulders 86 formed by the unreduced portions of the pinion teeth. The length of the reduced portions of the pinion teeth is slightly greater than the width of the hub of the gear wheel, and the small portions of the stubs 87 which project beyond the gear wheel hub are peened over against the hub, as clearly shown at 87ª in Fig. 9, thereby holding the gear wheel securely in place against the shoulders 86. By this means it will be clear that each tooth of the pinion 81 serves as a separate key to hold the gear wheel 80 in place. I therefore avoid the use of keys. I also obtain a structure which is the equivalent of a gear and pinion cast in an integral piece, with the advantage that there is no wasted space on the pinion near the gear wheel as would be the case with an integral casting. Gear wheel 82 is mounted upon a pinion 83 in the same manner as gear wheel 80 is mounted on pinion 81.

In the construction here shown, the armature 16 of motor 13 is operatively connected with the reduction gearing through the medium of a ratchet wheel and pawl. A sleeve 19 is mounted to rotate freely on spindle 17. This sleeve carries the armature 16. 22 is a ratchet wheel keyed to the spindle 17 (see Figs. 2, 4 and 5). 20 is a shell or drum fixed to the sleeve 19 by means of set screws 21, in which shell are pivoted pawls 23 operatively engaging the teeth of ratchet 22. These pawls are mounted on studs 23ª fixed in the shell 20, and are retained on the studs by a spring ring 99 which is located in an annular slot 20ª in shell 20. When the motor is to drive the mechanism, the armature 16 revolves in a counter-clockwise direction as seen in Fig. 4, so that the pawls 23 will engage the teeth of the ratchet 22 and the armature is therefore operatively connected with the mechanism so that the semaphore is moved against the action of gravity. When the semaphore is returning to the danger position, it will be clear that the pawls and ratchet teeth are still in engagement, so that the armature 16 is then driven backward. When however the semaphore and gearing are stopped, the ratchet device becomes ineffective and the armature 16 is then free to spin idly until its momentum is spent.

In order to prevent movement of the semaphore beyond its clear or vertical position due to momentum of the moving parts while the motor is driving the semaphore, I provide in the casing 12 a fixed stop 12ᵇ which engages the segmental gear 84 and thus arrests the movement of the parts if they have not already come to rest when the semaphore reaches the clear position. This may occur, for example, when the voltage applied to the motor is higher than normal, or when the semaphore and spectacle are lighter than those for which the mechanism is designed. On account of the reduction gearing between the motor and the semaphore, the motor armature may at times be revolving at considerable speed when the parts are brought to rest by the stop 12ᵇ, and the armature then has considerable momentum which, if not properly absorbed, might cause injury to the mechanism. Inasmuch, however, as the spindle 17 is long and slender, it is capable of considerable torsional deflection between the pinion 18 and the ratchet 22, and this deflectability is sufficient to absorb the momentum of the motor armature and thus protect the mechanism from injury.

I will now describe the holding device 14. 24 is a drum which is connected with the mechanism so as to be revolved therewith while the semaphore is returning toward danger position, but which is disconnected from the mechanism while the semaphore is moving in the other direction. The connecting means between this drum and the mechanism will be explained hereinafter. Projecting from the periphery of the drum 24 are one or more blades 25; as here shown three blades are provided. Each blade is preferably formed of laminations of clock spring steel built up substantially as shown in Figs. 3 and 5, thereby providing blades having great toughness yet which have great resiliency and are very light. 29 is a shaft suitably mounted in the inclosing casing. Freely mounted on this shaft is an arm 26 in the other end of which is trunnioned a roller 27. The movement of the arm is limited by the engagement of a projecting leg 55 with the bottom of the inclosing casing, and by the engagement of a projection 56 on the arm with a lug 57 in the inclosing casing. The movement of the arm 26 between these two stops is sufficient to permit the roller 27 to move into and out of the path of the blades 25. The movements of the arm 26 are controlled by an electromagnet 28 an armature 58 of which is provided with a stem 59 extending upwardly through the core of the magnet and engaging with the inside face of a chambered portion of the arm 26 as shown in Fig. 3. When the armature 58 occupies its lower position, the arm 26 rests against the bottom of the inclosing casing and the roller 27 is out of position for engagement with the blades 25, but when the magnet is energized so that its armature is raised, the arm 26 is also raised so that roller 27 is in position for engagement with the blades 25. It will be seen that when the arm 26 is held in the raised position, thereby holding roller 27 in position for engagement by the blades 25, the semaphore 90 will be held in whatever position it then occupies. When the semaphore is to be thus held in its caution or its clear position, the direction in which the blades 25 tend to move will depend upon whether the semaphore is arranged to be moved upwardly or downwardly from its horizontal position; and, therefore, the blades 25 will in one case engage the roller 27 on one side of its pivotal point and in the other case they will engage the roller on the other side of its pivotal point. In the case herein shown, that is, when the semaphore is arranged to be moved upwardly from its horizontal position, the direction in which the blades 25 tend to move when the semaphore is to be held in its caution or clear position is that indicated by the arrow 91 in Fig. 3, so that then the blades 25 will engage with the right-hand side of roller 27 as viewed in Fig. 3. With the parts of the apparatus proportioned as shown in the drawing, if the blade 25 remains straight, when in engagement with roller 27, the point of action between the blade 25 and the roller 27, the center of roller 27, and the center of shaft 29 are all in a straight line; then a small upward pressure on stem 59, sufficient only to overcome the weight of arm 26 and the stem, will suffice to hold the semaphore in the caution or clear position, and when this upward pressure on the stem is removed, the weight of the arm 26 is ample to cause this arm to fall, because the action between blade 25 and roller 27 is substantially without friction. In practice, however, the blade 25 actually bends slightly when engaging roller 27, so that there is then a toggle effect between the point of action of roller 27 and blade 25, the center of roller 27, and the center of shaft 29; this toggle effect tends to force arm 26 downwardly, and this tendency, added to the action of gravity on arm 26, must be resisted by magnet 28 to hold the semaphore in the caution or clear position. Obviously, if snow or ice accumulate on the semaphore 90, the additional weight will cause the blades 25 to bend still more when engaging the roller 27, so that the toggle effect will be increased, thereby increasing the tendency of the blades 25 to move the roller 27 out of their path and thus overcoming the additional friction on the roller shaft and on shaft 29 which results from the additional pressure on them. When the mechanism is so arranged that the semaphore 90 is moved from its horizontal position downwardly to its other position or positions, the direction of rotation of the parts is, of course, reversed, so that when the signal is to be held by the holding device 14 the blades 25 tend to rotate in the direction opposite to that indicated by the arrow 91 in Fig. 3; these blades will then engage with the left-hand face of roller 27 as viewed in Fig. 3, and with the parts proportioned as shown in the drawings there will be a toggle effect between the point of engagement of the blade and roller, the center of roller 27, and the center of shaft 29, which effect tends to move the arm 26 downwardly. With the proportions of parts shown in the drawing, this toggle effect will exist whether or not the blades 25 are bent by their pressure against the roller, but it is obvious that, if desired, the parts may be so proportioned that, as shown for the case of the semaphore movable upwardly from the horizontal, the toggle effect will exist only when the blades 25 bend. Mounted also to oscillate freely on the shaft 29 is a second arm 60, the free end of which is bifurcated to form two fingers 61 and 62, between which fingers moves a projecting lug 63 carried by the arm 26. The arm 60 carries insulation studs 64 on which are mounted a contact spring 30. When arm 26 occupies its lowest position, the spring 30 engages a contact 31, and a contact 34. When the arm 26 is raised, the lug 63 engages the upper finger 61 and so raises the arm 60, thereby disengaging spring 30 from contacts 31 and 34, and moving it into engagement with a contact 32. When the arm 26 again falls, arm 60 is free to fall also, again assuming the position indicated in the drawing. If, when the arm 60 is raised, the spring 30 should become fused with the contact 32, it will be seen that when the magnet 28 is deënergized the arm 26 can fall until lug 63 engages with finger 62; this movement of the arm 26 is sufficient to move roller 27 out of position for engagement with blades 25, so that the signal is then free to move to danger position. It will also be seen that in case of such fusing, the lug 63 will strike against the finger 62 when arm 26 falls, and if the fusion of the contacts is not too strong they will be separated by the blow.

As will be pointed out in explaining the operation of the signal as a whole, in the form of signal here shown the electromagnet 28 is energized simultaneously with the motor 13, hence the drum 24 must be so connected with the mechanism that it will not be rotated when the motor is driving the semaphore, as otherwise the blades 25 would then engage with the roller 27 and prevent movement of the mechanism. To accomplish this I provide a ratchet device between the drum and the spindle 17. This device comprises a drum 93 (see Figs. 2 and 5) in which are pivoted a plurality of pawls 92 which coact with the ratchet wheel 22. These pawls are mounted on studs 92ª fixed in drum 93, and are retained in place on the studs by a spring retaining ring 100 located in an annular slot 93ª in the drum 93. The drums 93 and 24 are not rigidly united, but the drum 24 is mounted between the drum 93 and a plate 94, which plate is held tightly against the drum 24 by means of a spring 33. By this construction, under ordinary conditions of operation the drums 24 and 93 are in effect one solid piece owing to the friction between the two but when subjected to some unusual stress, such as when the movement of the semaphore and gearing toward danger is unrestricted due to a failure of the buffing device hereinafter explained, a limited amount of slippage occurs and destructive shocks to the holding device are avoided. It will be clear that with the ratchet device just described, when the motor is driving the semaphore the ratchet 22 slips freely over the pawls 92, but that when the semaphore is returning toward danger the ratchet engages these pawls and the blades 25 are then revolved.

When the semaphore has been driven by the motor to the clear position, it falls back a slight distance before it is caught by the roller 27 of the holding device, and when it is so caught, the momentum of the moving parts developed by the slight backward movement is absorbed in part by the blade 25 and in part by the deflectable spindle 17, thus relieving the shock to roller 27 and the parts associated therewith. Also, when the semaphore is moving from the clear position toward the danger position and is arrested at the caution position, the momentum of the moving parts, which is then considerable, is likewise absorbed in part by the blade 25 and in part by spindle 17.

Referring now particularly to Figs. 1, 7 and 8, I will explain the form of circuit controller 15 which is here shown. The shaft 65, which is included in the gearing which connects the motor with the semaphore shaft, rotates about three times as fast as the semaphore shaft 10, and in the opposite direction. Suitably coupled with this shaft 65 is a circuit controller shaft 66, here shown as being of square cross-section. 67, 68 and 69 are three insulation sleeves identical in size and shape each of which is provided with a square hole which fits tightly on the shaft 66. A portion of the periphery of each sleeve is tapered as clearly shown in Fig. 1, and the entire circumference of the tapered portion is provided with teeth as indicated in Figs. 7 and 8. A plurality of these sleeves are mounted on the shaft 66. 70, 71 and 72 are three contact segments each in the form of an annular ring the inside face of which is tapered and toothed to fit the beveled portion of the periphery of the insulation sleeves 67, 68, etc. Each segment is provided with a contacting face in the form of a segment of a circle as shown in Figs. 7 and 8. 73 and 74 are contact-supporting blocks of insulating material suitably mounted on the frame of the mechanism so as to be located on opposite sides of the shaft 66, which blocks support a number of contact springs such as 39, 39ª, 40, 40ª, etc., which engage with the contacting faces of the contact segments. It will be seen that by means of the matching teeth on the tapered faces of the insulation sleeves and of the contact segments, these segments may be placed upon the sleeves at any desired angle thereby permitting of any desired angular adjustment of these segments with respect to the contact springs 39, 40, etc. Each contact spring 39, 39ª, 40, 40ª, etc., is located in a suitable slot 101 in supporting block 73 or 74, and each spring is provided with a cylindrical metal terminal block 102 located in a cylindrical hole 103 in the corresponding supporting block. Each spring is held securely in its slot by a screw 104 which passes through a slot in the end of the spring, a slot 106 in the supporting block, and into a threaded hole in the corresponding cylindrical terminal block 102. The outside face of each terminal block 102 is drilled and threaded to receive a screw 105 by means of which wires may be secured to the terminal block and thus electrically connected with the contact spring. Each contact spring is clamped between two plates 107 and 108 for the purpose of stiffening the spring. The holes 103 are staggered in location, in order to separate the terminal blocks 102 by the largest possible amount of insulating material.

Under some circumstances it is desirable that a contact segment should be disconnected from a contact spring at one point in the movement of the segment while the latter is rotating in one direction, and that the segment should make contact with the same spring at another point in the movement of the segment while rotating in the other direction. When this is so, a form of apparatus such as that shown in Figs. 7 and 8, and which I will now explain, may be employed.

Referring to Figs. 7 and 8, I have here shown segment 72 in front elevation. A ring 76 is located within the peripheral flange of the segment, and is mounted to oscillate on a stud 75 fixed in the radial web of the segment. Fixed to the ring 76 at a point substantially opposite the pivotal stud 75 is a block 77 of electro-conductive material, which block is of such height that its outside face projects slightly beyond the peripheral contacting face of the segments. The ring 76 and block 77 are normally biased to such position that block 77 engages the end of the peripheral flange of the segment, this being the position of the parts shown in Fig. 7; as here shown, this bias is effected by means of a circular spring 78 one end of which is secured to a block 79 mounted on the web of the segment and the other end of which presses against the ring 76 as shown in the drawing.

The operation of the apparatus shown in Figs. 7 and 8 is as follows: When the shaft 66 is rotated in the direction indicated by the arrows in Figs. 7 and 8, the segment 72 slides on contact spring $39^a$ until the latter engages block 77; as the shaft continues to rotate, spring $39^a$ drags the block 77 away from the end of the segment; the block then slides on the spring $39^a$ and the block 77 is dragged still farther away from the segment until ring 76 reaches the corner of block 79. Then upon further movement of the shaft 66 the block 77 is drawn away from spring $39^a$ and is snapped back to its normal position against the end of the segment. When the shaft 66 is then rotated in the direction opposite to that indicated by the arrows, the block 77 merely makes contact with spring $39^a$ in the same manner as though the block were an integral portion of the segment, and the block 77 and segment 72 then make sliding contact with the spring $39^a$ in the usual manner. It will be seen, therefore, that when the shaft 66 is rotated in the direction indicated by the arrow, the block 77 breaks contact with spring $39^a$ at one point in the movement of the shaft, and that when the shaft rotates in the other direction, the block 77 makes contact with spring $39^a$ at another point in the movement of the shaft, the latter point being removed several degrees from the former point in the direction indicated by the arrow. The purpose of this construction will appear hereinafter in the explanation of the operation of the signal as a whole.

Referring now to the circuit diagram shown in Fig. 6 I will explain the operation of the signal as a whole.

S is a signal governing traffic through a block section A, and $S^1$ is a signal governing traffic through a next succeeding block section B.

The electromagnet 28 as here shown comprises two windings, one of high resistance and another of low resistance. The low resistance winding is employed to obtain a high saturation of the magnet so that the armature 58 will be raised with considerable force, and is then included in series with the high resistance winding to help retain the arm 26 in the elevated position.

71 and 72 are contact segments included in the circuit controller 15 of the signal S, and 70 is a contact segment in the circuit controller 15 of the next succeeding signal $S^1$. The contacts 37, 38, 39, 40 and 41 coacting with these segments are opened and closed at the positions of the semaphores above the horizontal indicated in degrees in the drawing.

42 is a track relay connected with the rails of block section A, and 43 is a line relay controlled by the position of semaphore $S^1$ in the usual manner.

W is a car or train in block section A, moving in the direction indicated by the arrow. Signal S is at danger owing to the presence of this car or train, and signal $S^1$ is at clear. When the train W passes out of block A into block B, signal $S^1$ will go to danger, thereby opening line relay 43; and track relay 42 will close. Current then flows from battery 44 through armature contact 45, wires 46 and 47, contacts 39, wire 48, low resistance winding of magnet 28, wire 49, contact 34 and finger 30, wire 50, motor 13, wire 51 to battery 44. This current is insufficient to operate motor 13 owing to the resistance of the low resistance magnet winding, but it energizes magnet 28 and raises arm 26 thereby opening contact 34—30. Current then flows as before to the low resistance winding, then through the high resistance winding, wires 52 and 51, to battery 44, thereby holding arm 26 in the raised position. Current also then flows from battery 44 through contact 45, wires 46 and 53, contacts 37, wire 54, contact 32, finger 30, wire 50, motor 13, wire 51 to battery 44; this current operates the motor to move semaphore S. When the semaphore reaches the 45° position or caution position, the motor operating circuit is opened at contacts 37; the holding circuit through the low and high resistance windings of magnet 28 remains closed at contacts 39 so the semaphore S is held at caution position. When the train W passes out of block B, signal $B^1$ moves to caution position and in so doing when it reaches the 37° position it closes contacts 41, thereby energizing relay 43. Current then flows from battery 44 through armature contacts 96 and 97, wire 98, contacts 38 (which had closed when signal S reached the 42° position), wire 54, contact 32, finger 30, wire 50, motor 13, wire 51, to battery 44. This current operates the motor to move semaphore S to clear or 90° position; when the latter position is reached the motor operating circuit last traced is opened at contacts 38. The holding circuit through the magnet 28 was opened at contacts 39 at 53°, but was closed at contacts 40 at 51°, so this holding circuit is closed at all times while the signal is moving from caution to clear, and remains closed to hold the signal at clear or 90°.

When a following train enters block A, it opens track relay 42, which opens the holding circuit of magnet 28 thereby allowing arm 26 to fall, and the semaphore S then begins to fall back toward danger. The lowering of arm 26 however closes a short-circuit around the motor as follows,— from motor 13 through wire 50, finger 30, contact 31, resistance 95, wire 52 to motor. The motor therefore acts as a generator and retards the movement of the semaphore, thereby avoiding a severe blow when the danger position is reached. Similarly, if line relay 43 should be opened due to a train backing into block B or for any other cause, relay 42 remaining closed, the motor would retard the movement of the semaphore and avoid a severe blow to the holding device when the caution position is reached.

Assume now that while block sections A and B are unoccupied, a train backs into block section B or enters that block section from a switch. Signal S¹ would then fall to danger, opening relay 43. This would open the holding circuit of magnet 28, and signal S would fall toward danger until it reaches 46° at which point contact 39 closes thereby closing the holding circuit through magnet 28 and holding the signal at substantially 45° or caution position. It will be seen that during this movement toward caution position contacts 40 opened at 48° and contacts 39 did not close until the 46° position is reached, hence contacts 39 and 40 are not closed at the same time, as was the case while the signal was moving toward clear position. This action is due to contact block 77. If the contacts 39 and 40 were permitted to be closed at the same time during the last-described movement of the signal from clear to caution, then as soon as the contacts 39 close thereby closing the holding circuit and energizing magnet 28 as hereinbefore explained, a motor operating circuit would also be closed from battery 44 through armature contact 45, wires 46 and 47, contacts 39, wire 88, contacts 40, wire 98, contacts 38, wire 54, contact 32, finger 30, wire 50, motor 13, wire 51 to battery 44. Current in this circuit would cause the motor to operate to raise the signal through a few degrees until the circuit were again opened at contacts 39. This closing and opening of the circuits would be repeated, causing the signal to oscillate back and forth through an angle of a few degrees. This action is however avoided by means of the movable contact block 77. The variation between the opening and closing of contacts 40 is due to the lost motion in the coupling between shafts 65 and 66.

I do not, in the present application, make any claim for that portion of the circuit controller 15 comprising the shaft 66, the sleeves 67, 68 etc. mounted thereon, and the contact segments 70, 71, etc. mounted on the sleeves and angularly adjustable thereon, this being the subject-matter of my co-pending application filed June 26, 1913, Serial No. 775,840, which application is a division of the present application.

I do not, in the present application, make any claim for that portion of circuit controller 15 comprising the block 77 mounted on segment 72 and movable relatively thereto, this being the subject-matter of an application filed by Clinton O. Harrington on September 5, 1913, Serial No. 788,300.

I do not, in the present application, make any claim for the method of mounting a pinion on the teeth of a gear, as shown in Figs. 9, 10 and 11, this being the subject-matter of my co-pending application filed May 23, 1913, Serial No. 769,403, which latter case is a division of the present application.

Although I have herein shown and described only one form of railway signal embodying my invention, it is understood that various changes and modifications may be made therein within the scope of the appended claims without departing from the spirit and scope of my invention.

Having thus described my invention, what I claim is:

1. In combination, a signal device biased toward one position, a rotatable member operatively connected with said device when the latter moves or tends to move in response to its bias, a deflectable blade carried by said member, an arm mounted to oscillate, a roller journaled in said arm and movable into and out of the path of said blade by the oscillation of the arm; the point of contact between the blade and the roller when the blade is not deflected being substantially in the straight line between the center of the roller and the center of oscillation of the arm, whereby when the blade is deflected by the torque exerted by the signal device the said point of contact is not in said straight line, and a force is then exerted on the arm tending to move it out of position for engagement of the roller and the blade, the arm being biased to the latter position, and means for resisting said force and said bias of the arm.

2. In combination, a signal device biased toward one position, a rotatable member operatively connected with said device when the latter moves or tends to move in response to its bias, a deflectable blade carried by said member, an arm mounted to oscillate, a roller journaled in said arm and movable into and out of the path of said blade by the oscillation of the arm; the point of contact between the roller and the blade, when the latter is deflected by the torque exerted by the signal device, being slightly out of the straight line between the center of the roller and the center of oscillation of the arm whereby a force is then exerted on the roller tending to move it out of the path of the blade; and means for resisting said force.

3. In combination, a signal device biased toward one position, a rotatable member operatively connected with said device when the latter moves or tends to move in response to its bias, a deflectable blade carried by said member, an arm mounted to oscillate and having a blade-engaging element, the oscillation of said arm being such that the element moves into and out of the path of the blade; the direction of action between the said element and the blade, when the latter is deflected by the torque exerted on the member by the signal device, being at an angle to the line between the center of oscillation of the arm and the point of contact between the blade and the said element, which angle varies according to the torque exerted by the signal device; whereby a force is exerted on the arm tending to move it out of the path of the roller, which force varies according to the said angle; and means for resisting said force.

4. A railway signal comprising a signal device biased to one position of indication, means for moving it to another position; and a holding device for holding the signal device in the latter position and comprising a member rotated by the signal device when the latter returns toward the position to which it is biased, a blade mounted on said member and projecting therefrom in a substantially radial plane, an arm mounted to oscillate, a roller journaled in said arm and movable into and out of the path of the blade by the oscillation of the arm, the line through the center of the roller and the center of oscillation of the arm being substantially ninety degrees from the line through the center of the roller and the center of the rotatable member when the roller is in the path of the blade, said blade being deflectable from the radial plane when engaged by the roller.

5. In a railway signal, a signal device biased toward one position of indication, means for moving it to another position; and a holding device for holding it in the latter position comprising a rotatable member, means interposed between the member and the signal device for rotating the member only when the signal device is returning toward its biased position, a projection carried by the member, a second member adapted to engage with the projection, and means for the control of the second member.

6. In a railway signal, a signal device biased toward one position of indication, means for moving it to another position; and a holding device for holding it in the latter position comprising a rotatable member, a ratchet interposed between the member and the signal device to permit the member to remain stationary while the signal device is moving away from its biased position and to cause the member to rotate while the signal device is returning toward its biased position, a projection carried by the member, a second member adapted to move into and out of position for engagement with the projection, and means for the control of the second member.

7. In a railway signal, a signal device biased to one position of indication, an electric motor for moving it to another position of indication; a holding device for holding it in the latter position comprising a member operatively connected with the signal device to rotate therewith only when the latter is returning toward its biased position, a projection carried by said member, a second member, an electromagnet for moving the second member into position for engagement with the projection or for permitting it to move out of such position according to whether or not the magnet is energized, and means for energizing the magnet when the signal is being moved by the motor and when the signal is to be held by the holding device.

8. In a railway signal, a signal device biased to one position of indication, an electric motor for moving it to another position of indication; a holding device for holding it in the latter position comprising a member operatively connected with the signal device to rotate therewith only when the latter is returning toward its biased position, a projection carried by said member, a second member adapted to move into and out of position for engagement with said projection and biased to position out of such engagement, an electromagnet for moving the second member into position for engagement with the projection or for permitting it to move out of such position according to whether or not the magnet is energized, and means for energizing the magnet when the signal is being moved by the motor and when the signal is to be held by the holding device, a motor operating circuit and a motor braking circuit, and contacts operated by the second member for closing the braking circuit when the member is out of engaging position and for closing the operating circuit when the member is in engaging position.

9. A railway signal comprising a signal device biased to one position of indication, a motor for moving it to another position; a holding device comprising a member operatively connected with the signal device when the latter is moving or tends to move toward its biased position only, a second member adapted to coact with the first member to hold the signal and movable into and out of position for said coaction, means for holding said second member in coacting position while the signal device is being moved by the motor and when the signal device is to be held; a motor operating circuit and a motor braking circuit, and contacts operatively connected with the second member for closing the motor operating circuit when said member is in coacting position and for closing the braking circuit when the member is out of coacting position.

10. A railway signal comprising a signal device biased to one position of indication, a motor for moving it to another position; a holding device comprising a member operatively connected with the signal device when the latter is moving or tends to move toward its biased position only, a second member adapted to coact with the first member to hold the signal and movable into and out of position for said coaction, means for holding said second member in coacting position while the signal device is being moved by the motor and when the signal device is to be held; a braking circuit for the motor, and a contact operatively connected with the second member for controlling said circuit, said contact being closed when said second member is out of coacting position.

11. In combination, a signal device biased to one position of indication; an electric motor; means intermediate the motor and the signal device for moving the latter to another position, said means comprising two members one of which is movable with the motor armature and the other of which is movable with the signal device; a pawl and ratchet connection between the two said members; a holding device for the member movable with the signal device, and a pawl and ratchet device between the holding device and the last-mentioned member.

12. In combination, a signal device biased to one position of indication; a spindle, a pinion connected with said spindle adjacent one end thereof, gearing constantly connecting said pinion with the signal device, an electric motor the rotating member of which is mounted to rotate upon the said spindle, and a pawl and ratchet device connecting the said rotating member with the said spindle adjacent the other end of the latter, said spindle being capable of sufficient torsional deflection to protect the mechanism from injury due to shock when the signal device is brought to a sudden stop while being driven by the motor.

13. In combination, a signal device biased to one position of indication; a spindle, gearing constantly connecting the spindle with the signal device, an electric motor the rotating member of which is mounted upon the said spindle, a pawl and ratchet connection between the said rotating member and the said spindle; a holding device, and a pawl and ratchet connection between the holding device and the said spindle.

14. In combination, a signal device biased to one position of indication; a rotatable member constantly connected therewith, an electric motor, a holding device, a pawl and ratchet connection between the motor armature and the said rotatable member, and a pawl and ratchet connection between the holding device and the said rotatable member.

15. In combination, a signal device biased to one position of indication, an electric motor, a holding device, a pawl and ratchet connection between the signal device and the motor, and a pawl and ratchet connection between the signal device and the holding device, the two said connections being operative in reverse directions.

16. In combination, a signal device biased to one position of indication, a motor, a holding device, means interposed between the signal device and the motor for operatively connecting the two for movement in one direction only, and means interposed between the signal device and the holding device for operatively connecting the two for movement in the other direction only.

17. In combination, a signal device biased to one position of indication, a motor operatively connected therewith for moving it to another position, a holding device, and means interposed between the signal device and the holding device for operatively connecting the two when the signal device is moving toward its biased position only.

18. In combination, a signal device biased to one position of indication, a motor operatively connected therewith for moving it to another position, a holding device, and a pawl and ratchet connection between the signal device and the holding device for operatively connecting the two when the signal device is moving toward its biased position only.

19. A railway signal comprising a signal device, a spindle, a pinion connected with said spindle adjacent one end thereof, gearing constantly connecting the pinion with the signal device, a sleeve on the spindle adapted to rotate thereon, a motor the rotatable member of which is fixed on the sleeve, and a pawl and ratchet device connecting the sleeve and the spindle adjacent the other end of the latter, said spindle being capable of considerable torsional deflection whereby it is adapted to absorb shock when the signal device is brought to a sudden stop while being driven by the motor.

20. In combination, a signal device, a spindle capable of considerable torsional deflection, a pinion connected with said spindle, gearing constantly connecting said pinion with the signal device, a motor the rotatable member of which is mounted to rotate on said spindle, and a pawl and ratchet device connecting said rotatable member with the spindle, said pawl and ratchet device being connected with the spindle at a distance from the pinion sufficient to permit enough torsional deflection of the spindle between the two points to afford protection to the mechanism against injury from shock.

21. In combination, a signal device biased to one position of indication, a spindle, a pinion connected with said spindle adjacent one end thereof, gearing constantly connecting said pinion with the signal device, an electric motor the rotatable member of which is mounted to rotate on the spindle, means for connecting said rotatable member with the spindle, a holding device, and means for connecting said holding device with the spindle adjacent the other end of the latter, said spindle being capable of considerable torsional deflection whereby it is adapted to absorb shock when the signal is stopped by the holding device.

22. In combination, a signal device biased in one direction, a motor for moving it in opposition to the biasing force, and a spindle interposed in the connection between the motor and the signal device and capable of sufficient torsional deflection to protect the mechanism against injury from shock.

23. In combination, a signal device biased in one direction, a motor for moving it in opposition to the biasing force, a holding device, means for connecting said holding device with the signal device to hold the latter against the action of the biasing force, and a spindle interposed in said connecting means and capable of sufficient torsional deflection to protect the mechanism against injury from shock when the signal is stopped by the holding device.

24. In combination, a signal device biased in one direction, a spindle capable of considerable torsional deflection, gearing constantly connecting said spindle with said signal device, an electric motor for moving said signal device in opposition to its biasing force, the rotatable member of said motor being mounted to rotate on said spindle, and a directional clutch for connecting the rotatable member with the spindle at such a distance on the latter from the point of connection with the gearing as to permit enough torsional deflection of the spindle to protect the mechanism from injury due to shocks.

25. In combination, a signal device biased in one direction, a spindle capable of considerable torsional deflection, speed-reducing gearing connecting said spindle with said signal device, an electric motor connected with said spindle for moving the signal device in opposition to its biasing force, and a stop for limiting the movement of the signal device in the latter direction, said motor and said gearing being connected with said spindle at such distance apart as to permit enough torsional deflection of the spindle to absorb the momentum of the motor and thus protect the mechanism from injury due to shock when the movement of the parts is suddenly arrested by said stop.

In testimony whereof I affix my signature in presence of two witnesses.

JOHN P. COLEMAN.

Witnesses:
J. C. MOCK,
JOHN JANOVSKY.

Copies of this patent may be obtained for five cents each, by addressing the "Commissioner of Patents, Washington, D. C."